US012239934B2

(12) United States Patent
Olson et al.

(10) Patent No.: US 12,239,934 B2
(45) Date of Patent: *Mar. 4, 2025

(54) PULSE RING ASSEMBLY FOR AIR CLEANER SYSTEMS AND METHODS THEREOF

(71) Applicant: Donaldson Company, Inc., Bloomington, MN (US)

(72) Inventors: Thomas R. Olson, Prior Lake, MN (US); Fred H. Wahlquist, Bloomington, MN (US); David W. Mulder, Bloomington, MN (US); Robert R. Levac, Burnsville, MN (US); Daniel E. Adamek, Bloomington, MN (US)

(73) Assignee: Donaldson Company, Inc., Bloomington, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/231,012

(22) Filed: Aug. 7, 2023

(65) Prior Publication Data

US 2023/0372859 A1 Nov. 23, 2023

Related U.S. Application Data

(63) Continuation of application No. 16/962,097, filed as application No. PCT/US2019/013826 on Jan. 16, 2019, now Pat. No. 11,731,072.

(Continued)

(51) Int. Cl.
B01D 46/24 (2006.01)
B01D 46/44 (2006.01)
(Continued)

(52) U.S. Cl.
CPC .......... *B01D 46/71* (2022.01); *B01D 46/2411* (2013.01); *B01D 46/446* (2013.01);
(Continued)

(58) Field of Classification Search
CPC ...................... B01D 46/0024; B01D 46/0068; B01D 46/24; B01D 46/44; B01D 46/64;
(Continued)

(56) References Cited

U.S. PATENT DOCUMENTS 3,631,792 A 1/1972 Bodine
5,562,251 A 10/1996 Elliott
(Continued)

FOREIGN PATENT DOCUMENTS

CN 103347582 10/2013
CN 105682765 6/2016
(Continued)

OTHER PUBLICATIONS

International Patent Application No. PCT/US2019/013826 filed Jan. 16, 2019, International Search Report and Written Opinion issued Apr. 25, 2019, 12 pages.
(Continued)

*Primary Examiner* — Minh Chau T Pham
(74) *Attorney, Agent, or Firm* — Mueting Raasch Group

(57) ABSTRACT

A pulse ring assembly for air cleaner systems that is adapted to produce a pulse ring of gas to clean a filter element. The air cleaner system may include an outer tube and an inner tube configured to receive the inner tube such that at least a portion of an interior surface of the outer tube faces at least a portion of an exterior surface of the inner tube. The outer tube may include a pulse port extending between the interior and exterior surfaces of the outer tube into an outer tube passageway. Filtered air may be configured to flow from a first filter cartridge, through the outer and inner tubes, and to
(Continued)

an engine intake. The system may also include a pulse jet apparatus in fluid communication with the pulse port of the outer tube and configured to direct gas through the pulse port towards the first filter cartridge.

20 Claims, 9 Drawing Sheets

Related U.S. Application Data

(60) Provisional application No. 62/617,957, filed on Jan. 16, 2018.

(51) Int. Cl.
  *B01D 46/46* (2006.01)
  *B01D 46/64* (2022.01)
  *B01D 46/71* (2022.01)
  *F02M 35/024* (2006.01)
  *F02M 35/08* (2006.01)
  *F02M 35/10* (2006.01)

(52) U.S. Cl.
  CPC ............ *B01D 46/46* (2013.01); *B01D 46/64* (2022.01); *F02M 35/02416* (2013.01); *F02M 35/086* (2013.01); *F02M 35/10144* (2013.01); *B01D 2279/60* (2013.01)

(58) Field of Classification Search
  CPC .. B01D 46/71; B01D 46/446; B01D 46/2411; B01D 2279/60; F02M 35/086; F02M 25/0201; F02M 35/02416; F02M 35/10144
  USPC ............................ 55/302, 385.3; 95/273, 280
  See application file for complete search history.

(56) References Cited

U.S. PATENT DOCUMENTS

| | | | |
|---|---|---|---|
| 5,683,479 A * | 11/1997 | Gillingham | B01D 46/10 55/385.3 |
| 5,887,797 A | 3/1999 | Elliott | |
| 7,927,396 B2 * | 4/2011 | Olson | B01D 46/4272 55/420 |
| 8,404,021 B2 * | 3/2013 | Gillingham | B01D 46/4272 55/428 |
| 9,186,612 B2 * | 11/2015 | Wahlquist | B01D 46/0045 |
| 9,309,841 B2 | 4/2016 | Troxell et al. | |
| 9,347,570 B2 * | 5/2016 | Shamir | B01D 29/908 |
| 10,456,717 B2 | 10/2019 | Orlans | |
| 11,731,072 B2 * | 8/2023 | Olson | F02M 35/10144 55/283 |
| 2009/0308034 A1 | 12/2009 | Olson et al. | |
| 2011/0011042 A1 | 1/2011 | Gillingham et al. | |
| 2013/0239802 A1 * | 9/2013 | Troxell | B01D 46/0086 95/20 |
| 2020/0155994 A1 | 5/2020 | Xu et al. | |
| 2020/0338488 A1 | 10/2020 | Olson et al. | |

FOREIGN PATENT DOCUMENTS

| | | |
|---|---|---|
| CN | 206434966 | 8/2017 |
| FR | 2939691 A1 | 6/2010 |
| WO | 2012/046240 | 4/2012 |
| WO | 2019/0143704 | 7/2019 |

OTHER PUBLICATIONS

International Patent Application No. PCT/US2019/013826 filed Jan. 16, 2019, PCT International Preliminary Report on Patentability issued Jul. 21, 2020, 8 pages.

* cited by examiner

PULSE RING ASSEMBLY FOR AIR CLEANER SYSTEMS AND METHODS THEREOF

RELATED APPLICATION

This application is a continuation of U.S. patent application Ser. No. 16/962,097, filed on Jul. 14, 2020, now U.S. Pat. No. 11,731,072, which is the § 371 U.S. National Stage of International Application No. PCT/US2019/013826, filed 16 Jan. 2019, which claims the benefit of U.S. Provisional Application No. 62/617,957, filed 16 Jan. 2018, and entitled PULSE RING ASSEMBLY FOR AIR CLEANER SYSTEMS AND METHODS THEREOF, the disclosures of which are incorporated herein by reference in their entireties.

FIELD OF THE DISCLOSURE

The disclosure herein relates generally to pulse ring assemblies for air cleaner systems that may be used in, e.g., vehicles and other equipment. The pulse ring assemblies allow for pulse cleaning of air filter media to, e.g., remove filtrate from the air filter media.

Pulse cleaning of air filter systems may be used to improve filtering capacity and filter media life. Typically, air filter systems must be designed and built to include the components needed to provide pulse cleaning.

SUMMARY

Pulse ring assemblies for air cleaner systems used in vehicles and related methods are described herein. In one or more embodiments, the pulse ring assembly may be configured to be positioned or retrofitted between an air filter outlet and an engine intake. In other embodiments, the pulse ring assembly may be incorporated into an air cleaner body. The pulse ring assembly may include a pulse jet apparatus that is configured to direct gas or fluid towards the air filter outlet (e.g., an outlet through which filtered air passes towards the engine intake) to force dust and debris off of filter media (e.g., positioned proximate the air filter outlet). The pulse ring assembly may be described as a self-contained unit that may be attached or retrofit to the air filter outlet on one end and may be attached or retrofit to the engine intake on the other end. In other words, the air filter outlet or engine intake may not need to be modified (e.g., by creating openings or inserting components through a sidewall thereof) to include the pulse jet apparatus. As such, for example, the pulse ring assembly may be retrofit onto an existing air filter system passageway to convert the passageway into a self-cleaning passageway (e.g., because the pulse ring assembly includes components to clean the filter media). Also, for example, the pulse ring assembly may be incorporated into an air cleaner body (e.g., at the end of the air cleaner) and may be positioned to generate pulses that force air through a safety filter element and/or between the safety filter element and a primary filter element.

An exemplary air cleaner system may include an outer tube, an inner tube, and a pulse jet apparatus. The outer tube may extend between an outer filter outlet end and an outer engine intake end. The outer tube may include an interior surface and an exterior surface. The interior surface of the outer tube may define an outer tube passageway through the outer tube between the outer filter outlet end and the outer engine intake end. The outer tube may include a pulse port extending between the interior and exterior surfaces into the outer tube passageway. The inner tube may extend along a longitudinal axis between an inner filter outlet end and an inner engine intake end. The inner tube may include an interior surface and an exterior surface. The interior surface of the inner tube may define an inner tube passageway through the inner tube between the inner filter outlet end and the inner engine intake end. The outer tube may be configured to receive the inner filter outlet end within the outer tube passageway such that at least a portion of the interior surface of the outer tube faces at least a portion of the exterior surface of the inner tube proximate the inner filter outlet end. Filtered air may be configured to flow from a first filter cartridge proximate the outer filter outlet end to an engine proximate the inner engine intake end. The pulse jet apparatus may be in fluid communication with the pulse port of the outer tube. The pulse jet apparatus may be configured to direct gas through the pulse port towards the first filter cartridge (e.g., towards the outer filter outlet end).

In one or more embodiments of the air cleaner system as described herein, the air cleaner system further comprises a housing extending around the exterior surface of the outer tube, wherein the housing comprises a first filter cartridge in fluid communication with the inner tube passageway and a second filter cartridge surrounding the first filter cartridge, wherein the housing defines an additional pulse port positioned between the first and second filter cartridges and an inlet such that the first and second filter cartridges are positioned between the inlet and the inner tube passageway, wherein filtered air is configured to flow from the inlet to the engine proximate the inner engine intake end, wherein the pulse jet apparatus is in fluid communication with the additional pulse port, wherein the pulse jet apparatus is configured to direct gas through the additional pulse port.

In one or more embodiments of the air cleaner system as described herein, the additional pulse port defines an annular shape between the first and second filter cartridges.

In one or more embodiments of the air cleaner system as described herein, the pulse jet apparatus is configured to be selectively activated such that the gas is directed in discrete pulses through the additional pulse port.

In one or more embodiments of the air cleaner system as described herein, the pulse jet apparatus is configured to be selectively activated such that such that the gas is directed in discrete pulses from the pulse port of the outer tube towards the outer filter outlet end.

In one or more embodiments of the air cleaner system as described herein, the pulse port is positioned along the outer tube at a location between the inner filter outlet end and the outer engine intake end.

In one or more embodiments of the air cleaner system as described herein, the pulse port is positioned closer to the outer engine intake end than the inner filter outlet end.

In one or more embodiments of the air cleaner system as described herein, the pulse port is spaced a distance from the inner filter outlet end of about 5.08 cm or less measured along the longitudinal axis.

In one or more embodiments of the air cleaner system as described herein, the air cleaner system further comprises a seal between the interior surface of the outer tube and the exterior surface of the inner tube.

In one or more embodiments of the air cleaner system as described herein, the interior surface of the outer tube is concentric with and spaced a selected gap distance from the exterior surface of the inner tube.

In one or more embodiments of the air cleaner system as described herein, the gap distance is about 0.254 cm or more and/or 7.62 cm or less.

In one or more embodiments of the air cleaner system as described herein, the interior surface of the outer tube defines a first diameter proximate the outer filter outlet end and a second diameter proximate the outer engine intake end, wherein the first and second diameters are different.

In one or more embodiments of the air cleaner system as described herein, the first diameter proximate the outer filter outlet end is less than or equal to the second diameter proximate the outer engine intake end.

In one or more embodiments of the air cleaner system as described herein, the first diameter of the interior surface of the outer tube is equal to or less than a diameter of the exterior surface of the inner tube.

In one or more embodiments of the air cleaner system as described herein, the air cleaner system further comprises a controller operably connected to the pulse jet apparatus, wherein the controller is configured to selectively activate the pulse jet apparatus.

In one or more embodiments of the air cleaner system as described herein, the controller is configured to automatically activate the pulse jet apparatus in response to a predetermined pressure differential across the first filter cartridge.

An exemplary method of retrofitting a pulse ring assembly between an air filter outlet of an air cleaner system and an engine intake. The method may include connecting an outer tube to the air filter outlet. The outer tube may extend between an outer filter outlet end connected to the air filter outlet and an outer engine intake end. The outer tube may include an interior surface and an exterior surface. The interior surface of the outer tube may define an outer tube passageway through the outer tube between the outer filter outlet end and the outer engine intake end. The outer tube may include a pulse port extending between the interior and exterior surfaces into the outer tube passageway.

The method may also include positioning an inner tube within the outer tube passageway. The inner tube may extend along a longitudinal axis between an inner filter outlet end and an inner engine intake end. The inner tube may include an interior surface and an exterior surface. The interior surface of the inner tube may define an inner tube passageway through the inner tube between the inner filter outlet end and the inner engine intake end. The inner filter outlet end may be positioned within the outer tube passageway such that an outer pulse portion of the interior surface of the outer tube faces the exterior surface of the inner tube. Filtered air may be configured to flow from the air filter outlet to the engine intake. The method may further include connecting the inner engine intake end to the engine intake and connecting a pulse jet apparatus in fluid communication with the pulse port of the outer tube. The pulse jet apparatus may be configured to direct gas from the pulse port of the outer tube towards the outer filter outlet end.

In one or more embodiments of the method as described herein, the method further comprises selectively activating the pulse jet apparatus.

In one or more embodiments of the method as described herein, selectively activating the pulse jet apparatus comprises directing gas in spaced-apart pulses from the pulse port of the outer tube towards the outer filter outlet end.

In one or more embodiments of the method as described herein, the method further comprises manually operating the pulse jet apparatus to direct gas from the pulse port of the outer tube towards the outer filter outlet end.

In one or more embodiments of the method as described herein, the method further comprises operating the pulse jet apparatus to direct gas from the pulse port of the outer tube towards the outer filter outlet end when a predetermined pressure differential across a filter cartridge proximate the air filter outlet is reached.

In one or more embodiments of the method as described herein, the pulse port is positioned closer to the outer engine intake end than the inner filter outlet end.

In one or more embodiments of the method as described herein, the method further comprises providing a seal between the interior surface of the outer tube and the exterior surface of the inner tube.

In one or more embodiments of the method as described herein, the pulse port is positioned closer to the seal than the inner filter outlet end.

In one or more embodiments of the method as described herein, the interior surface of the outer tube is concentric with and spaced a selected gap distance from the exterior surface of the inner tube.

In one or more embodiments of the method as described herein, the gap distance is about 0.254 cm or more and/or 7.62 cm or less.

In one or more embodiments of the method as described herein, the pulse port is spaced a distance from the inner filter outlet end of about 5.08 cm or less measured along the longitudinal axis.

In one or more embodiments of the method as described herein, the interior surface of the outer tube defines a first diameter proximate the outer filter outlet end and a second diameter proximate the outer engine intake end, wherein the first and second diameters are different.

In one or more embodiments of the method as described herein, the first diameter proximate the outer filter outlet end is less than or equal to the second diameter proximate the outer engine intake end.

In one or more embodiments of the method as described herein, the first diameter of the interior surface of the outer tube is equal to or less than a diameter of the interior surface of the inner tube.

An exemplary pulse ring retrofit apparatus for an air cleaner system connected between an air filter outlet and an engine intake, the retrofit apparatus may include an outer tube, an inner tube, and a pulse jet apparatus. The outer tube may extend between an outer filter outlet end and an outer engine intake end. The outer filter outlet end may be connected to the air filter outlet. The outer tube may include an interior surface and an exterior surface. The interior surface of the outer tube may define an outer tube passageway through the outer tube between the outer filter outlet end and the outer engine intake end. The outer tube may include a pulse port extending between the interior and exterior surfaces into the outer tube passageway. The inner tube may extend along a longitudinal axis between an inner filter outlet end and an inner engine intake end. The inner engine intake end may be connected to the engine intake. The inner tube may include an interior surface and an exterior surface. The interior surface of the inner tube may define an inner tube passageway through the inner tube between the inner filter outlet end and the inner engine intake end. The outer engine intake end may be configured to receive the inner filter outlet end within the outer tube passageway such that an outer pulse portion of the interior surface of the outer tube faces the exterior surface of the inner tube. Filtered air may be configured to flow from a filter cartridge proximate the air filter outlet to an engine proximate the engine intake. The pulse jet apparatus may be in fluid communication with the pulse port of the outer tube. The pulse jet apparatus may be configured to direct gas from the pulse port of the outer tube towards the outer filter outlet end.

In one or more embodiments of the pulse ring retrofit apparatus as described herein, the pulse jet apparatus is configured to be selectively activated such that the gas is directed in spaced-apart pulses from the pulse port of the outer tube towards the outer filter outlet end.

In one or more embodiments of the pulse ring retrofit apparatus as described herein, the pulse port is positioned in the outer tube at a location between the inner filter outlet end and the outer engine intake end.

In one or more embodiments of the pulse ring retrofit apparatus as described herein, the pulse port is positioned closer to the outer engine intake end than the inner filter outlet end.

In one or more embodiments of the pulse ring retrofit apparatus as described herein, the pulse port is spaced a distance from the inner filter outlet end by about 5.08 cm or less measured along the longitudinal axis.

In one or more embodiments of the pulse ring retrofit apparatus as described herein, the pulse ring retrofit apparatus further comprises a seal between the interior surface of the outer tube and the exterior surface of the inner tube.

In one or more embodiments of the pulse ring retrofit apparatus as described herein, the pulse port is positioned closer to the seal than the inner filter outlet end.

In one or more embodiments of the pulse ring retrofit apparatus as described herein, the interior surface of the outer tube is concentric with and spaced a gap distance from the exterior surface of the inner tube such that gas from the pulse port is configured to create an annular cross-section of gas directed towards the outer filter outlet end.

In one or more embodiments of the pulse ring retrofit apparatus as described herein, the gap distance is about 0.254 cm or more and/or 7.62 cm or less.

In one or more embodiments of the pulse ring retrofit apparatus as described herein, the interior surface of the outer tube defines a first diameter proximate the outer filter outlet end and a second diameter proximate the outer engine intake end, wherein the first and second diameters are different.

In one or more embodiments of the pulse ring retrofit apparatus as described herein, the first diameter proximate the outer filter outlet end is less than or equal to the second diameter proximate the outer engine intake end.

In one or more embodiments of the pulse ring retrofit apparatus as described herein, the first diameter of the interior surface of the outer tube is equal to or less than a diameter of the interior surface of the inner tube.

In one or more embodiments of the pulse ring retrofit apparatus as described herein, the pulse ring retrofit apparatus further comprises a controller operably connected to the pulse jet apparatus, wherein the controller is configured to selectively activate the pulse jet apparatus.

In one or more embodiments of the pulse ring retrofit apparatus as described herein, the controller is configured to automatically activate the pulse jet apparatus in response to a lower pressure differential across the filter cartridge.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings.

DETAILED DESCRIPTION

Figure 1:
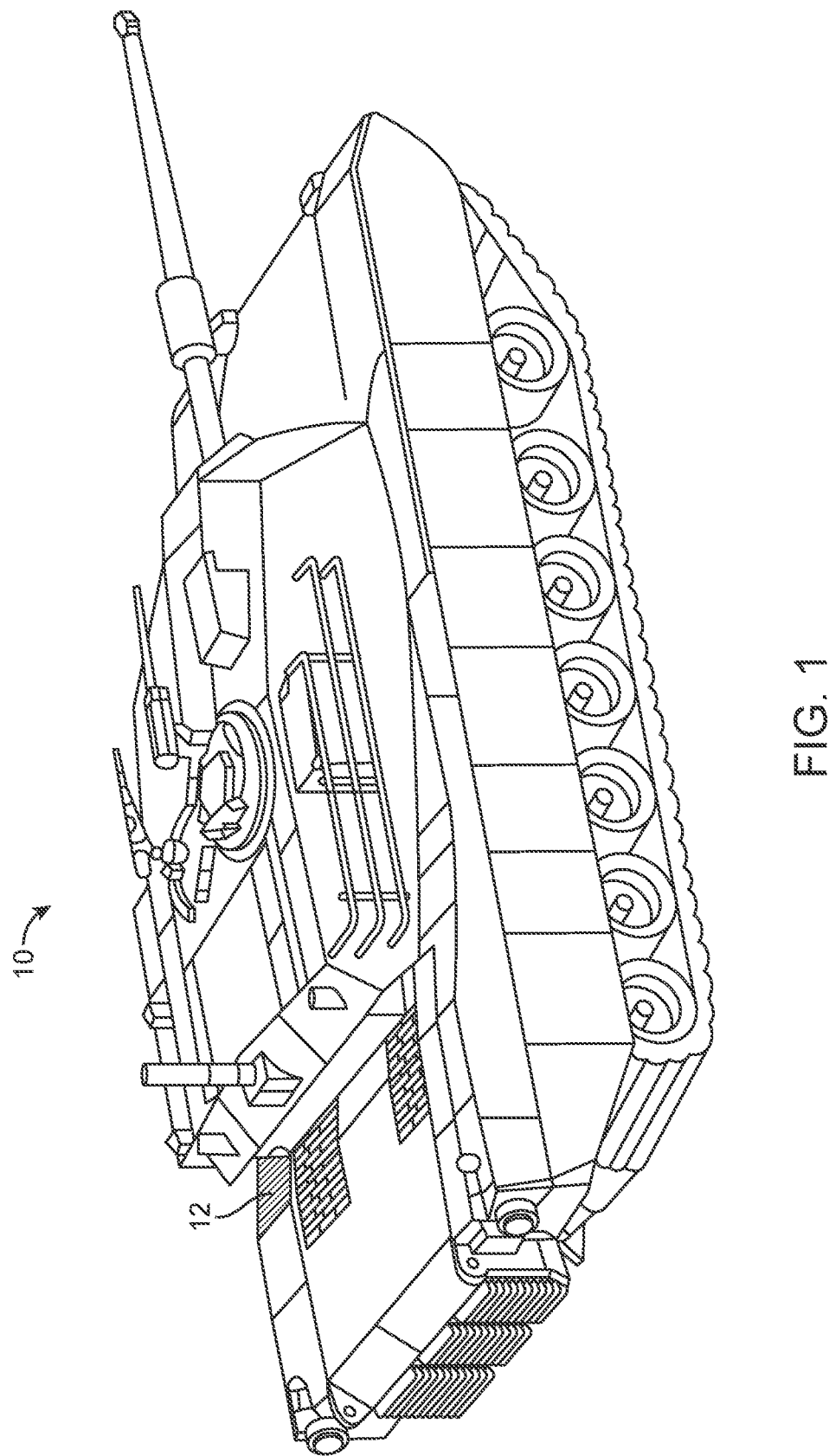
FIG. 1 is a perspective view of one illustrative embodiment of a vehicle incorporating a pulse ring assembly as described herein.

In the following description of illustrative embodiments, reference is made to the accompanying figures of the drawing, which form a part hereof, and in which are shown, by way of illustration, specific embodiments. It is to be understood that other embodiments may be utilized and structural changes may be made without departing from the scope of the present invention.

The disclosure herein includes illustrative embodiments of systems, apparatus, structures, and methods for a pulse ring assembly that may be positioned or retrofit between an air filter outlet and an engine intake of a vehicle (e.g., a tank, an armored truck, etc.). The pulse ring assembly may be configured (e.g., using a pulse jet apparatus) to force pulses of gas or fluid towards the air filter outlet of an air cleaner system to move debris and sediment out of an air cleaner housing of the vehicle. The pulse ring assembly may be retrofit into the filtering system such that a section of the filtering system may be removed between the air filter outlet (e.g., downstream of air filter media/cartridge) and the engine intake so that the pulse ring assembly may be positioned therebetween. As such, the filtering system may be converted from a standard filtering system into one that includes a self-cleaning apparatus (e.g., the pulse ring assembly described herein) that may clean the air filter media using one or more pulses of gas or fluid. In other embodiments, the pulse ring assembly may be incorporated into an air cleaner housing.

The pulse ring assembly may take any suitable form extending between the air filter outlet and the engine intake. For example, the pulse ring assembly may include an outer tube and an inner tube that overlap (e.g., one extends within the other), with the ends of the outer and inner tubes that are not overlapping configured to be connected to either the air filter outlet or the engine intake. The overlapping portions may form a concentric or annular chamber (e.g., between an inner surface of the outer tube and an outer surface of the inner tube) that may be in fluid communication with the pulse jet apparatus. The pulse jet apparatus may generate a pulse of gas or fluid (e.g., to clean the air filter media) that fills the concentric or annular chamber and may be forced towards the air filter outlet (e.g., due to the structure of the pulse ring assembly, due to the pressure differential, etc.). This pulse of gas may be described as a pulse ring due to the shape created by the configuration of the inner and outer tubes (e.g., defining concentric or annular opening/chamber).

One illustrative embodiment of an air cleaner system within a vehicle 10 is depicted in FIG. 1. Specifically, FIG. 1 illustrates an M1 tank, however, the air cleaner system described herein may be applied to air filter systems of a variety of vehicles and/or equipment. For example, the air cleaner system may be implemented within tracked personnel carriers, wheeled vehicles, mobile generators, stationary generators, etc.

The vehicle 10 may include an inlet 12 configured to allow the flow of air from the exterior environment, through filter media, and towards the engine intake. The inlet 12 may be located at any suitable location on the vehicle 10. In some embodiments, the vehicle 10 may include a pulse ring assembly 100 (not shown in FIG. 1), as described herein, between the inlet 12 and the engine intake such that the air cleaner system (e.g., air filtering system) may be configured to clean itself from debris or sediment on the exterior of the filter media. In other embodiments, the vehicle may be modified such that a pulse ring assembly 100 may be retrofitted into the air cleaner system between the inlet 12 and the engine intake.

The pulse ring assembly 100, as described herein, may simplify the process of converting an air filter system present in a vehicle to include a self-cleaning apparatus. For example, the pulse ring assembly 100 may be connected to the air filter system of the vehicle 10 in-line with the air filter system and only connected at two locations along the air filter system. For example, a section of the air filter system (e.g., a section of tubing) may be removed and replaced with the pulse ring assembly 100 described herein. Removing a section of the air filter system and replacing it with a pulse ring assembly 100 may allow for more robust and solid connections between the pulse ring assembly 100 and the existing portions of the air filter system. For example, connecting the pulse ring assembly 100 into the air filter system may only include connecting the ends of two pipes or tubes (e.g., an end of the pulse ring assembly 100 with an end of the air filter system).

Further, self-cleaning apparatus typically extend into the flow path of the air filter system and generate a pulse of gas from an end of the self-cleaning apparatus that is centered in the air filter system passageway. As a result, air flow from the air filter outlet to the engine intake may pass directly into the end of the self-cleaning apparatus. Providing a pulse ring assembly 100 that produces a pulse ring that is generated along the interior surface of the air filter system passageway (e.g., as described herein) may alleviate this issue. For example, the geometry and configuration of the pulse ring assembly 100 may reduce the likelihood of air flow from the air filter outlet to the engine intake passing directly into the end of the self-cleaning apparatus.

The pulse ring assembly 100 may be actuated manually or automatically. Further, the pulse ring assembly 100 may provide for hands-off solutions to maintaining a clean filter system. For example, the pulse cleaner apparatus may help to further automate the cleaning process to ensure an efficient and effective way to maintain clean filter media.

Figure 2:
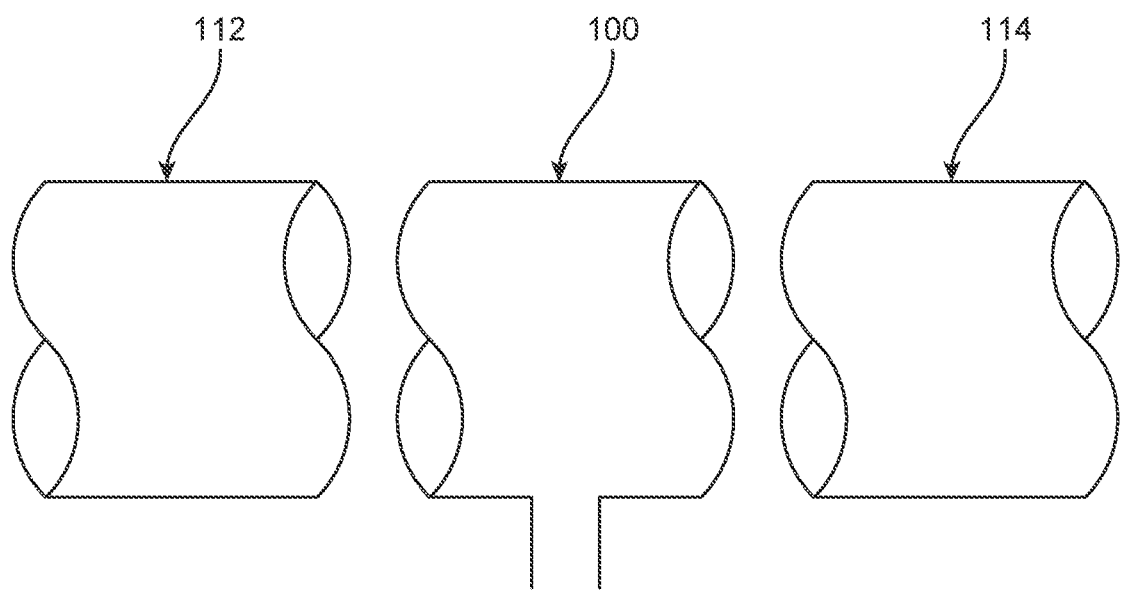
FIG. 2 is schematic view of one illustrative embodiment of a pulse ring assembly between an air filter outlet and an engine intake.

FIG. 2 illustrates a schematic representation of a pulse ring assembly 100 positioned between an air filter outlet 112 and an engine intake 114. The air filter outlet 112 may be an extension from the inlet 12 of the vehicle 10 (e.g., as shown in FIG. 1). In other words, air from the external environment may pass from the inlet 12 of the vehicle 10, through a filter cartridge or filter media (e.g., to filter the external air before it enters the engine intake 114) towards the air filter outlet 112. The filtered air may then pass through the pulse ring assembly 100 and towards the engine intake 114. The engine intake 114 may be any suitable path or structure to deliver filtered air to the engine.

The pulse ring assembly 100 may be positioned between the air filter outlet 112 and the engine intake 114 to, e.g., form a passageway between the air filter outlet 112 and the engine intake 114. Further, the pulse ring assembly 100 may be positioned downstream of the air filter outlet 112 (e.g., between the filter cartridge and the engine intake 114, and within a clean air space) such that the pulse ring assembly 100 may direct a pulse of gas back towards the air filter outlet 112 (e.g., to clean the filter cartridge/media). The pulse ring assembly 100 may be initially positioned between the air filter outlet 112 and the engine intake 114 (e.g., during construction of the air filter system) or may be retrofit (e.g., attached after construction of the air filter system) between the air filter outlet 112 and the engine intake 114. The pulse ring assembly 100 may be coupled or attached to each of the air filter outlet 112 and the engine intake 114 in any suitable way, e.g., by welding, mechanical fasteners, clamps, fittings, etc. Further, the interface between the pulse ring assembly 100 and each of the air filter outlet 112 and the engine intake 114 may be sealed to, e.g. prevent undesired elements from entering and potentially contaminating the clean air space.

In such embodiments in which the pulse ring assembly 100 may be retrofit between the air filter outlet 112 and the engine intake 114, a section of the air filter system may be removed between the air filter outlet 112 and the engine intake 114 and replaced with the pulse ring assembly 100. As such, instead of attempting to modify the existing air filter system to include components to assist in pulse cleaning the filter cartridge/media (e.g., by producing selective openings to add components or tubes for a pulse jet apparatus), an entire section of the air filter system may be replaced with the pulse ring assembly 100 (e.g., which includes the components necessary to provide pulse cleaning). Replacing a section of the air filter system with the pulse ring assembly 100 may provide a more efficient and effective modification than creating selective openings at various points along the air filter system. For example, the pulse ring assembly 100 may be only attached within the air filter system at the air filter outlet 112 and the engine intake 114—not at various locations along the air filter system.

Figure 3:
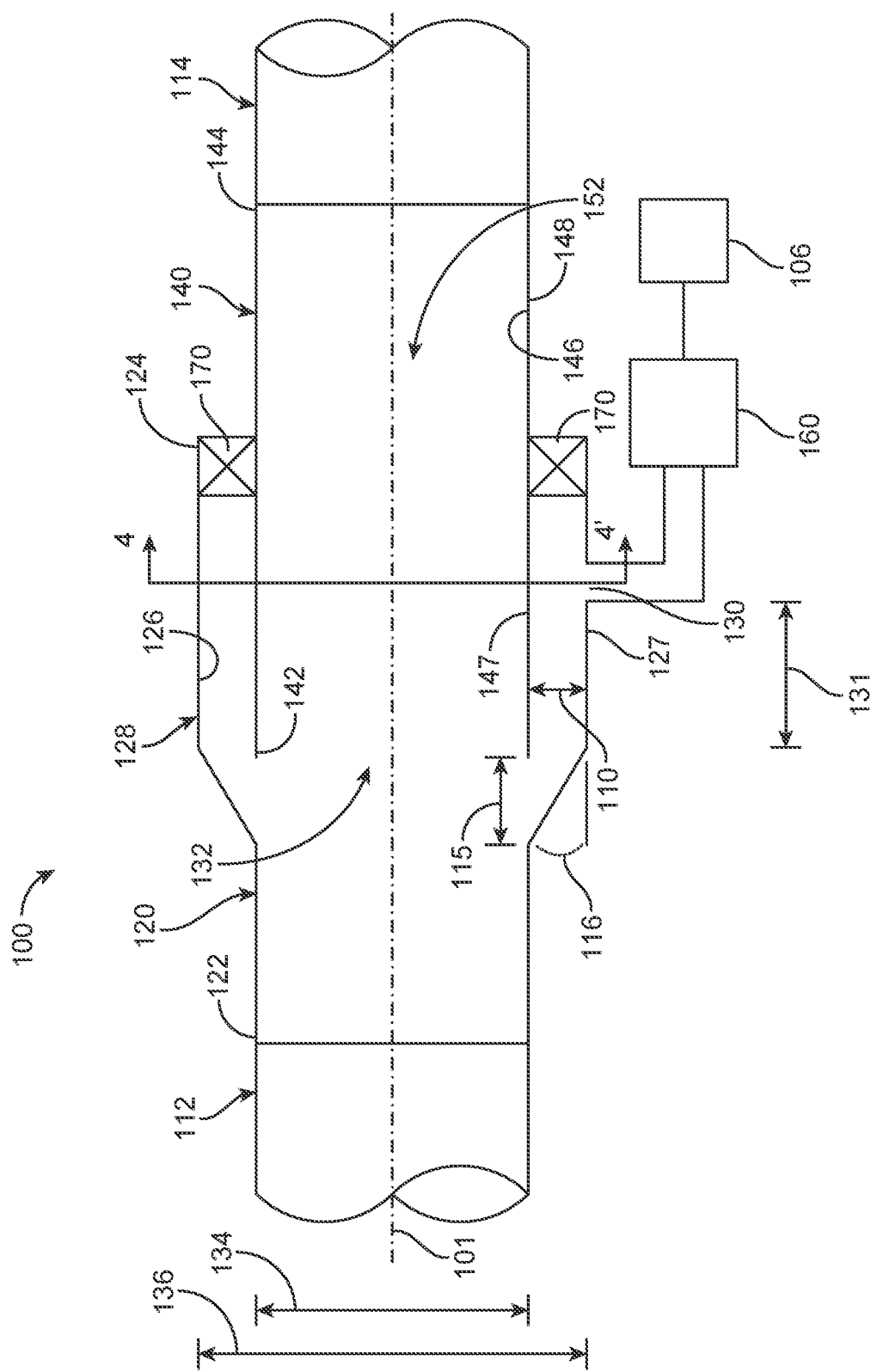
FIG. 3 is a cross-sectional schematic view of a pulse ring assembly.

A cross-sectional schematic view of one illustrative embodiment of a pulse ring assembly 100 connected between an air filter outlet 112 and an engine intake 114 is shown in FIG. 3. For example, the pulse ring assembly 100 may be arranged or oriented such that filtered air may flow from a filter cartridge proximate the air filter outlet 112, through the pulse ring assembly 100, and towards an engine proximate the engine intake 114. Furthermore, the pulse ring assembly 100 may be arranged or oriented to extend along a longitudinal axis 101. In some embodiments, the longitudinal axis 101 may define a straight axis such that the pulse ring assembly 100 extends along a straight line. In other embodiments, the longitudinal axis 101 may extend along a path that is not straight (e.g., a curved path).

The pulse ring assembly 100 may include an outer tube 120 extending between an outer filter outlet end 122 and an outer engine intake end 124 (e.g., along the longitudinal axis 101). The outer filter outlet end 122 may be positioned closer to the air filter outlet 112 than the engine intake 114 and the outer engine intake end 124 may be positioned closer to the engine intake 114 than the air filter outlet 112. Further, in one or more embodiments, the outer filter outlet end 122 (e.g., the filter outlet end of the outer tube 120) may be coupled or attached to the air filter outlet 112 (e.g., as described with reference to FIG. 2).

Furthermore, the outer tube 120 may include an interior surface 126 and an exterior surface 128. The interior surface 126 of the outer tube 120 may define an outer tube passageway 132 through the outer tube 120 between the outer filter outlet end 122 and the outer engine intake end 124. In other words, gas or fluid may flow through the outer tube 120 (e.g., within the outer tube passageway 132) between the outer filter outlet end 122 and the outer engine intake end 124. Additionally, in one or more embodiments, the outer tube 120 may include a pulse port 130 extending between the interior surface 126 and the exterior surface 128 into the outer tube passageway 132 (e.g., defining an opening through the outer tube 120). In other words, the pulse port 130 may provide a path of fluid communication between something positioned outside of the exterior surface 128 and the outer tube passageway 132.

The pulse ring assembly 100 may also include an inner tube 140 extending between an inner filter outlet end 142 and an inner engine intake end 144 (e.g., along the longitudinal axis 101). The inner filter outlet end 142 may be positioned closer to the air filter outlet 112 than the engine intake 114 and the inner engine intake end 144 may be positioned closer to the engine intake 114 than the air filter outlet 112. Further, in one or more embodiments, the inner engine intake end 144 may be coupled or attached to the engine intake 114 (e.g., as described with reference to FIG. 2).

Furthermore, the inner tube 140 may include an interior surface 146 and an exterior surface 148. The interior surface 146 of the inner tube 140 may define an inner tube passageway 152 through the inner tube 140 between the inner filter outlet end 142 and the inner engine intake end 144. In other words, gas or fluid may flow through the inner tube 140 (e.g., within the inner tube passageway 152) between the inner filter outlet end 142 and the inner engine intake end 144.

The outer tube 120 may be configured to receive the inner tube 140 within the outer tube passageway 132. For example, the outer engine intake end 124 (e.g., the engine intake end of the outer tube 120) may be configured to receive the inner filter outlet end 142 (e.g., the filter outlet end of the inner tube 140). Therefore, filtered air from the air filter outlet 112 may pass from the outer tube 120 to the inner tube 140 and onto the engine intake 114. As such, the outer tube 120 and the inner tube 140 may overlap such that at least a portion of the interior surface 126 of the outer tube 120 may face at least a portion of the exterior surface 148 of the inner tube 140. The portion of the interior surface 126 of the outer tube 120 that faces the inner tube 140 may be described as an outer pulse portion 127 of the interior surface 126 of the outer tube 120 and the portion of the exterior surface 148 of the inner tube 140 that faces the outer tube 120 may be described as an inner pulse portion 147 of the exterior surface 148 of the inner tube 140. Therefore, the outer pulse portion 127 of the interior surface 126 of the outer tube 120 may face the inner pulse portion 147 of the exterior surface 148 of the inner tube 140. The outer and inner pulse portions 127, 147 may be the region for which a ring of gas may be formed (e.g., due to a pulse jet apparatus) to clean the filter cartridge/media, as described further herein.

The pulse ring assembly 100 may also include a seal 170 between the interior surface 126 of the outer tube 120 and the exterior surface 148 of the inner tube 140. For example, the seal 170 may be positioned proximate the outer engine intake end 124. The seal 170 may be configured to prevent undesired elements from entering the space between the inner tube 140 and the outer tube 120 (and, e.g., within the clean air space). The seal 170 may be any suitable component that may seal the space between the outer tube 120 and the inner tube 140.

The pulse ring assembly 100 may further include a pulse jet apparatus 160 in fluid communication with the pulse port 130 of the outer tube 120. The pulse jet apparatus 160 may be configured to direct gas or fluid from the pulse port 130 of the outer tube 120 towards the outer filter outlet end 122. For example, the pulse jet apparatus 160 may be configured to direct gas through the pulse port 130 and into the outer and inner pulse portions 127, 147 of the outer and inner tubes 120, 140. The gas from the pulse jet apparatus 160 may then be forced towards the air filter outlet 112 (e.g., due to the positioning and configuration of the outer and inner pulse portions 127, 147) to, e.g., clean debris from the outside of the filter cartridge/media (e.g., by pulsing gas from the pulse jet apparatus 160 at the inside of the filter cartridge/media).

The pulse jet apparatus may operate in a similar way as described in, e.g., U.S. Pat. No. 8,404,021 entitled "Pulse Jet Air Cleaner System; Components; and, Methods," U.S. Pat. No. 5,683,479 entitled "Air Cleaner Having Scavenger Arrangement," U.S. Pat. No. 7,927,396 entitled "Evacuation Value Arrangements; Pulse Jet Air Cleaner Systems Using Same; and, Method," and U.S. Pat. No. 9,186,612 entitled "Pulse Jet Air Cleaner Systems; Evacuation Valve Arrangements; Air Cleaner Components; and Methods."

The pulse port 130 (through which the pulse jet apparatus 160 directs gas back towards the air filter outlet 112 to clean the filter cartridge) may be positioned along the outer tube 120 at a location between the inner filter outlet end 142 and the outer engine intake end 124. In other words, the pulse port 130 may be positioned anywhere along the length where the outer tube 120 and the inner tube 140 overlap (e.g., within the outer and inner pulse portions 127, 147). For example, the pulse port 130 may be positioned closer to the outer engine intake end 124 than the inner filter outlet end 142. In other words, the pulse port 130 may be positioned as close to the seal 170 as possible to, e.g., prevent extra "dead" space through which gas from the pulse jet apparatus 160 may not flow (e.g., because the seal 170 may allow flow in only one direction away from the seal). In other embodiments, the pulse port 130 may be positioned closer to the inner filter outlet end 142 than the outer engine intake end 124 or halfway between the inner filter outlet end 142 and the outer engine intake end 124.

Furthermore, the pulse port 130 may be spaced a distance 131 from the inner filter outlet end 142 of about 5.08 cm (e.g., about 2 inches) or less measured along the longitudinal axis 101. The distance 131 may provide for the gas from the pulse jet apparatus 160 to travel through the outer and inner pulse portions 127, 147 for the distance 131 to direct (e.g., along the longitudinal axis 101) and smooth the flow before it passes towards the air filter outlet 112. In other words, the distance 131 may prevent the gas from the pulse jet apparatus 160 from immediately passing into the outer tube passageway 132 in an undesired direction.

The inner tube and the outer tube of a pulse ring assembly as described herein may define any cross-sectional shape or shapes such that the inner tube may be received by the outer tube. For example, the inner and outer tubes may define a cross-sectional shape that is, e.g., circular, oval, hexagonal, etc. and, further, the inner and outer tubes may have the same or different shapes.

The inner tube 140 and the outer tube 120 may have diameters in the region in which they overlap such that the inner tube 140 may be received by the outer tube 120. The term "diameter" as used herein includes, for non-circular tubes, an effective diameter of the non-circular opening which is the diameter of a circle having the same area as the non-circular opening.

Figure 4:
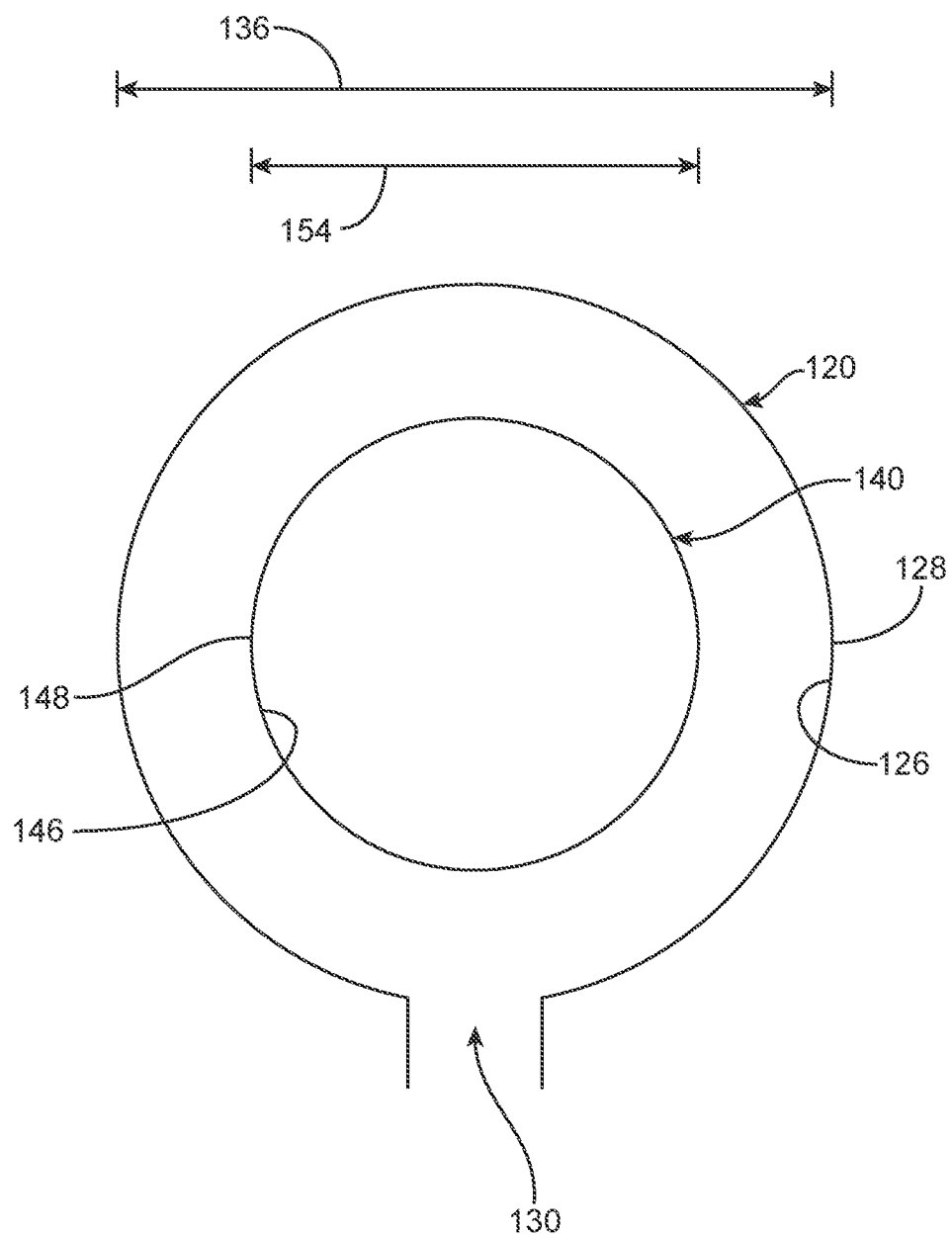
FIG. 4 is a cross-sectional view of the pulse ring assembly of FIG. 3 taken along line 4-4' of FIG. 3.

The inner tube 140 of one or more embodiments of a pulse ring assembly 100 as described herein may define a diameter 154 that may be any suitable length. Specifically, the diameter 154 of the inner tube 140 may be about 2.54 cm (e.g., about 1 inch) or more and/or about 30.48 cm (e.g., about 12 inches) or less. More specifically, the diameter 154 of the inner tube 140 may be about 10.16 cm (e.g., about 4 inches). Also, for example, the outer tube 120 may define a diameter (e.g., a second diameter 136) that may be any suitable distance that may be greater than the diameter 154 of the inner tube 140. Specifically, the diameter 136 of the outer tube 120 may be about 2.54 cm (e.g., about 1 inch) or more and/or about 33.02 cm (e.g., about 13 inches) or less. For example, FIG. 4 illustrates the diameters 136, 154 of the outer and inner tubes 120, 140, respectively. Further, each of the outer and inner tubes 120, 140 may define any suitable thickness.

Figure 5:
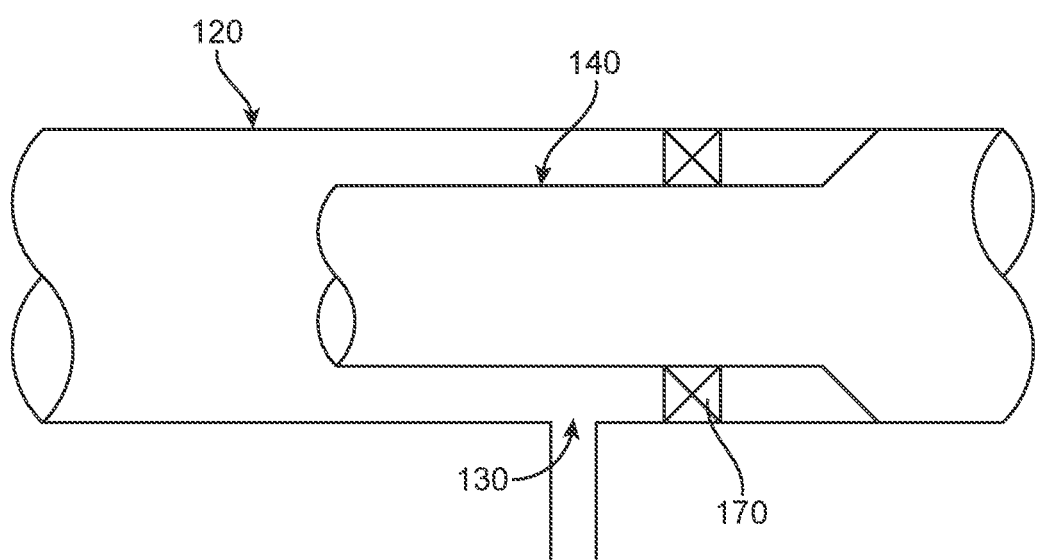
FIG. 5 is a cross-sectional schematic view of another illustrative embodiment of a pulse ring assembly.

Additionally, the outer tube 120 may define multiple diameters along the length of the outer tube 120 (e.g., along the longitudinal axis 101). For example, as shown in FIG. 3, the outer tube 120 may define a first diameter 134 (e.g., measured from the interior surface 126 of the outer tube 120) proximate the outer filter outlet end 122 and the second diameter 136 (e.g., as described herein) proximate the outer engine intake end 124. In one or more embodiments, the first and second diameters 134, 136 may be different (e.g., such that outer tube 120 tapers at a portion between the outer filter outlet end 122 and the outer engine intake end 124). For example, the first diameter 134 may be less than or equal to the second diameter 136. In other embodiments, the outer tube 120 may define a single diameter along the length of the outer tube 120 between the outer filter outlet end 122 and the outer engine intake end 124 (e.g., as shown in FIG. 5). Specifically, the first diameter 134 of the outer tube 120 may be about 2.54 cm (e.g., about 1 inch) or more and/or about 30.48 cm (e.g., about 12 inches) or less.

As described herein, the filtered air (e.g., from the air filter outlet 112) may travel from the outer tube 120 to the inner tube 140 and then on to the engine intake 114. Therefore, the cross-sectional area of each of the outer tube 120 and the inner tube 140 may be similar to maintain a consistent flow of air (e.g., pressure or velocity) therebetween. As a result, the first diameter 134 of the outer tube 120 may be equal to or less than the diameter 154 of the inner tube 140 to maintain a consistent cross-sectional area. Further, a similar diameter (e.g., the first diameter 134 of the outer tube 120 and the diameter 154 of the inner tube 140) may prevent filtered air from directly going into the space between the outer tube 120 and the inner tube 140 overlap. In some embodiments, the first diameter 134 of the outer tube 120 may be greater than the diameter 154 of the inner tube 140.

In one or more embodiments of the pulse ring assemblies described herein, the interior surface 126 of the outer tube 120 and the exterior surface 148 of the inner tube 140 may be spaced a selected gap distance from one another (e.g., gap distance 110 in the depicted embodiments). The gap distance may, in one or more embodiments, be uniform about the perimeter of the inner tube and/or along the length of the region in which the inner tube is positioned within the outer tube. In one or more alternative embodiments, the gap distance may be non-uniform when moving about the perimeter of the inner tube and/or along the length of the region in which the inner tube is positioned within the outer tube.

In one or more embodiments, the gap distance 110 between the inner tube 140 and the outer tube 120 may be about 0.254 cm (e.g., about 0.1 inches) or more and/or about 7.62 cm (e.g., about 3 inches) or less. In some embodiments, the inner tube 140 and the outer tube 120 may define concentric cross-sectional shapes (e.g., circular shapes) such that, e.g., the interior surface 126 of the outer tube 120 and the exterior surface 148 of the inner tube 140 are the same distance apart for the entirety of the overlapped portion. The gap distance 110 may be sealed by the seal 170 proximate the outer engine intake end 124, as described herein. Further, a longitudinal gap 115 between the inner filter outlet end 142 and the outer tube 120 extending along the longitudinal axis 101 may also assist in controlling the gas flow from the pulse jet apparatus 160. Specifically, the longitudinal gap 115 may be about 0.3175 cm (e.g., about 0.125 inches) or more and/or 1.905 cm (e.g., about 0.75 inches) or less. Further yet, the outer tube 120 may taper/expand between the outer filter outlet end 122 and the outer engine intake end 124 at an angle 116 of about 0 degrees or more and/or 60 degrees or less. Specifically, the angle 116 may be about 30 degrees. For example, selectively choosing the spacing of the gaps and angles between the inner and outer tubes 140, 120 (e.g., the gap distance 110, the longitudinal gap 115 measured along the longitudinal axis 101, and the taper of the outer tube 120) may control volume and trajectory of gas delivered by the pulse jet apparatus 160 to clean the filter cartridge/media proximate the air filter outlet 112.

It is noted that FIG. 3 illustrates a cross-sectional schematic and, therefore, gas flowing from the pulse jet apparatus 160 would fill the entire annular space between the inner tube 140 and the outer tube 120 (e.g., the overlap section), and flow towards the air filter outlet 112 in a, e.g., ring shape. In other words, gas from the pulse jet apparatus 160 would be present between the inner tube 140 and the outer tube 120 at both of the top and bottom portions of overlap (of the inner and outer tubes 140, 120) as illustrated in FIG. 3. For example, as shown in FIG. 4, the entire gap distance 110 between the inner tube 120 and the outer tube 140 is in fluid communication with the pulse port 130.

The inner and outer tubes 140, 120 of the pulse ring assembly 100 may also be arranged as shown in FIG. 5. For example, the outer tube 120 may define a single diameter along the longitudinal axis 101 and the inner tube 140 may define multiple diameters to be received within the outer tube 120. Specifically, the portion of the inner tube 140 received by the outer tube 120 defines a smaller diameter and produces a gap distance 110 between the inner and outer tubes 140, 120. The illustrative embodiment shown in FIG. 5 may include similar features as described herein with respect to other illustrative embodiments (e.g., the pulse port 130 is defined by the outer tube 120, seal 170 between the inner and outer tubes 140, 120, etc.)

As shown in FIG. 3, the pulse ring assembly 100 may also include a controller 106 operably coupled to the pulse jet apparatus 160 (or to air supply sources thereof) and may be configured to selectively activate the pulse jet apparatus 160.

For example, the controller 106 may be configured to selectively activate the pulse jet apparatus 160 such that the gas is directed (e.g., in discrete pulses) from the pulse port 130 of the outer tube 120 towards the outer filter outlet end 122. The activation of the pulse jet apparatus 160 may be in response to any possible signal that the filter cartridge needs cleaning provided by, e.g., a pressure sensor, a light sensor, a timer, etc. For example, the controller 106 may be configured to automatically activate the pulse jet apparatus 160 in response to a predetermined pressure differential across the filter cartridge (e.g., as determined using a pressure sensor). In other embodiments, the controller 106 may be configured to continuously activate the pulse jet apparatus 160 for a period of time. The controller 106 may be configured to allow for manual activation (e.g., a manual override) of the pulse jet apparatus 160 or automatically activate the pulse jet apparatus 160. For example, an operator (e.g., a vehicle operator) may actuate or push a button that is operably connected (e.g., wired or wireless) to the pulse jet apparatus 160 (or, e.g., a pulse valve) to manually activate the pulse jet apparatus 160, therefore, the operator will be aware of when the cleaning pulse will occur.

The methods and/or logic described in this disclosure, including those attributed to the pulse ring assembly 100, or various constituent components (e.g., the controller 106), may be implemented, at least in part, in hardware, software, firmware, or any combination thereof. For example, various aspects of the techniques may be implemented within one or more processors, including one or more microprocessors, microcontrollers, DSPs, ASICs, FPGAs, or any other equivalent integrated or discrete logic circuitry, as well as any combinations of such components, or other devices. The term "processor" or "processing circuitry" may generally refer to any of the foregoing logic circuitry, alone or in combination with other logic circuitry, or any other equivalent circuitry. Such hardware, software, and/or firmware may be implemented within the same system or within separate systems to support the various operations and functions described in this disclosure. In addition, any of the described components may be implemented together or separately as discrete but interoperable logic devices.

When implemented in software, the functionality ascribed to the systems, devices and methods described in this disclosure may be embodied as instructions and/or logic on a computer-readable medium such as RAM, ROM, NVRAM, EEPROM, FLASH memory, magnetic data storage media, optical data storage media, or the like. The instructions and/or logic may be executed by one or more processors to support one or more aspects of the functionality described in this disclosure.

Figure 6:
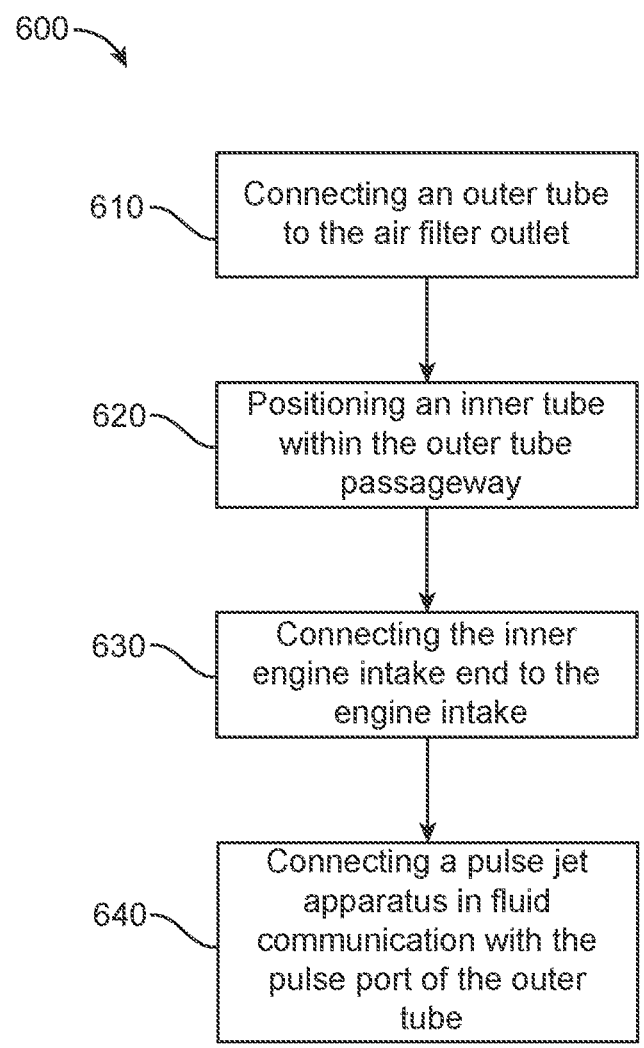
FIG. 6 is a method of retrofitting a pulse ring assembly between an air filter outlet and an engine intake.

FIG. 6 illustrates a flow chart depicting a method 600 of retrofitting a pulse ring assembly (e.g., pulse ring assembly 100) between an air filter outlet (e.g., air filter outlet 112) and an engine intake (e.g., engine intake 114). The method 600 may include connecting 610 an outer tube (e.g., outer tube 120) to the air filter outlet. The outer tube may be connected to the air filter outlet in any suitable way. The outer tube may extend between an outer filter outlet end connected to the air filter outlet and an outer engine intake end. The outer tube may include an interior surface and an exterior surface. The interior surface of the outer tube may define an outer tube passageway through the outer tube between the outer filter outlet end and the outer engine intake end. The outer tube may include a pulse port extending between the interior and exterior surfaces into the outer tube passageway.

The method 600 may also include positioning 620 an inner tube (e.g., inner tube 140) within the outer tube passageway. The inner tube may extend along a longitudinal axis between an inner filter outlet end and an inner engine intake end. The inner tube may include an interior surface and an exterior surface. The interior surface of the inner tube may define an inner tube passageway through the inner tube between the inner filter outlet end and the inner engine intake end. The inner filter outlet end may be positioned within the outer tube passageway such that an outer pulse portion of the interior surface of the outer tube faces the exterior surface of the inner tube. Filtered air may be configured to flow from the air filter outlet to the engine intake. The method 600 may also include connecting 630 the inner engine intake end to the engine intake (e.g., the inner tube may be connected to the engine intake in any suitable way) and connecting 640 a pulse jet apparatus (e.g., pulse jet apparatus 160) in fluid communication with the pulse port of the outer tube. The pulse jet apparatus may be configured to direct gas from the pulse port of the outer tube towards the outer filter outlet end.

In one or more embodiments, the method 600 may further include manually operating the pulse jet apparatus to direct gas from the pulse port of the outer tube towards the outer filter outlet end or operating the pulse jet apparatus to direct gas from the pulse port of the outer tube towards the outer filter outlet end, e.g., when (or in response to) a predetermined pressure differential across a filter cartridge proximate the air filter outlet is reached. In one or more embodiments, the method 600 may also include selectively activating the pulse jet apparatus. For example, selectively activating the pulse jet apparatus may include directing gas in spaced-apart pulses from the pulse port of the outer tube towards the outer filter outlet end.

Figure 7A:
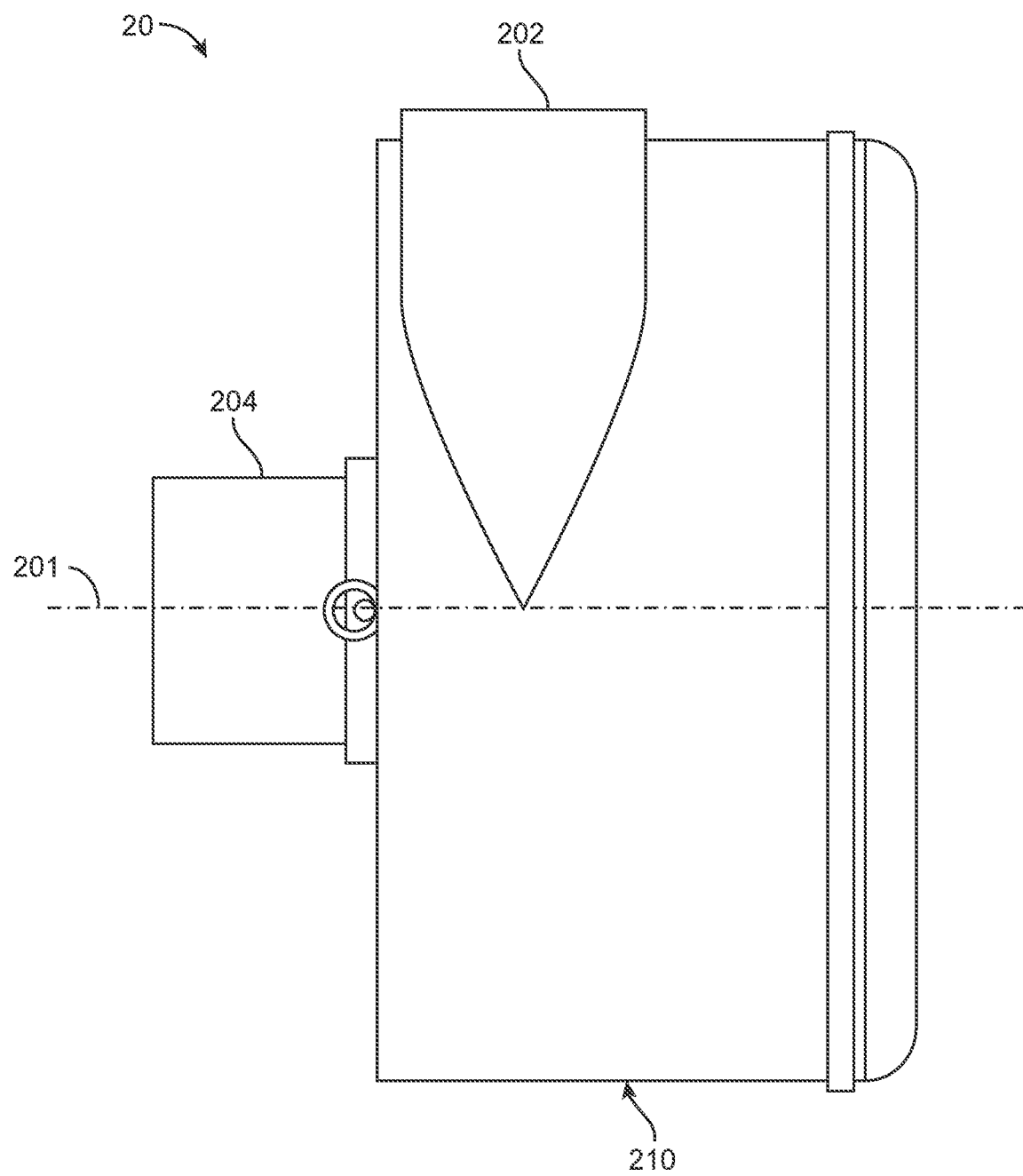
FIG. 7A is side view of an air cleaner system including another illustrative embodiment of a pulse ring assembly.
Figure 7B:
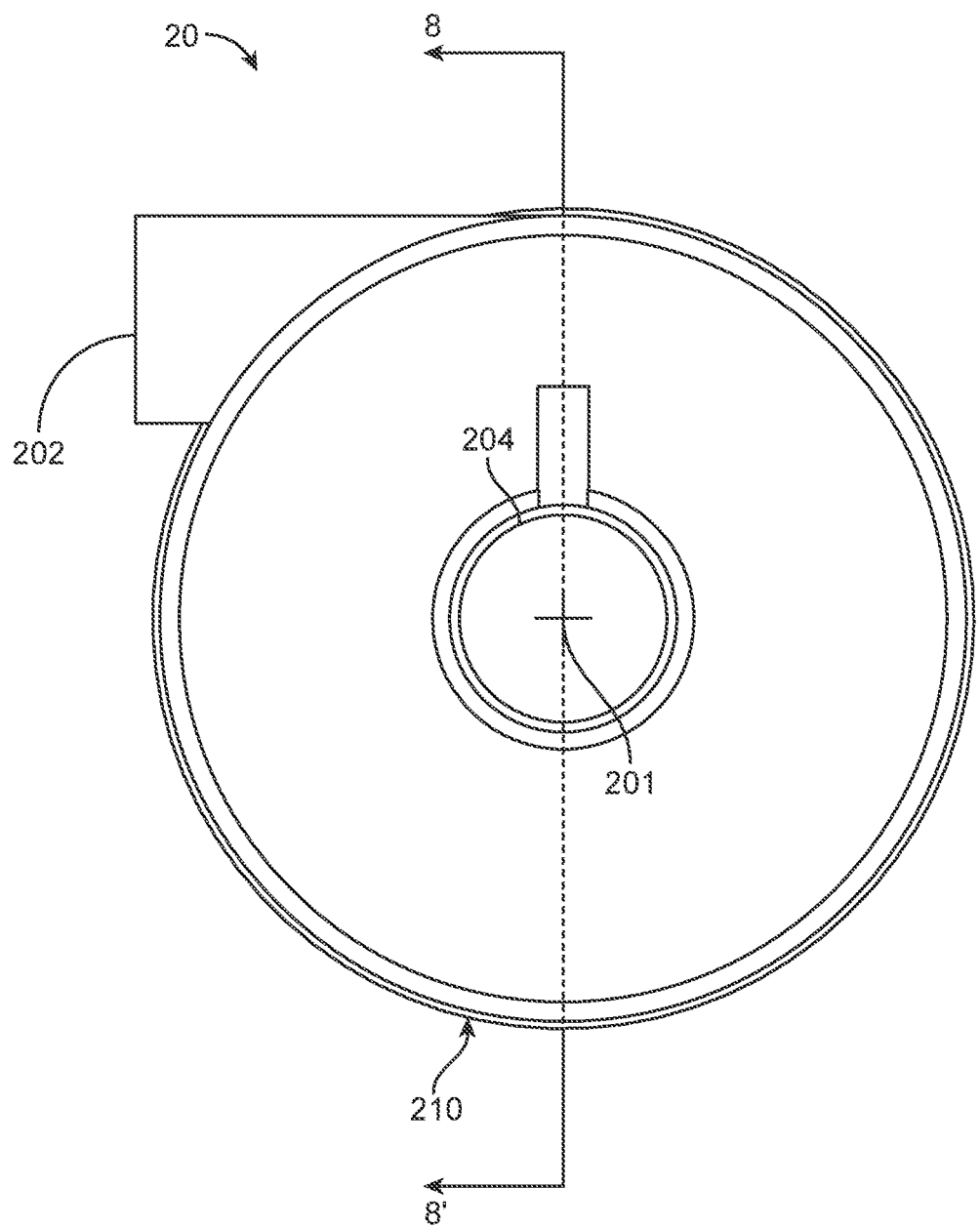
FIG. 7B is a front view of the air cleaner system of FIG. 7A.
Figure 8:
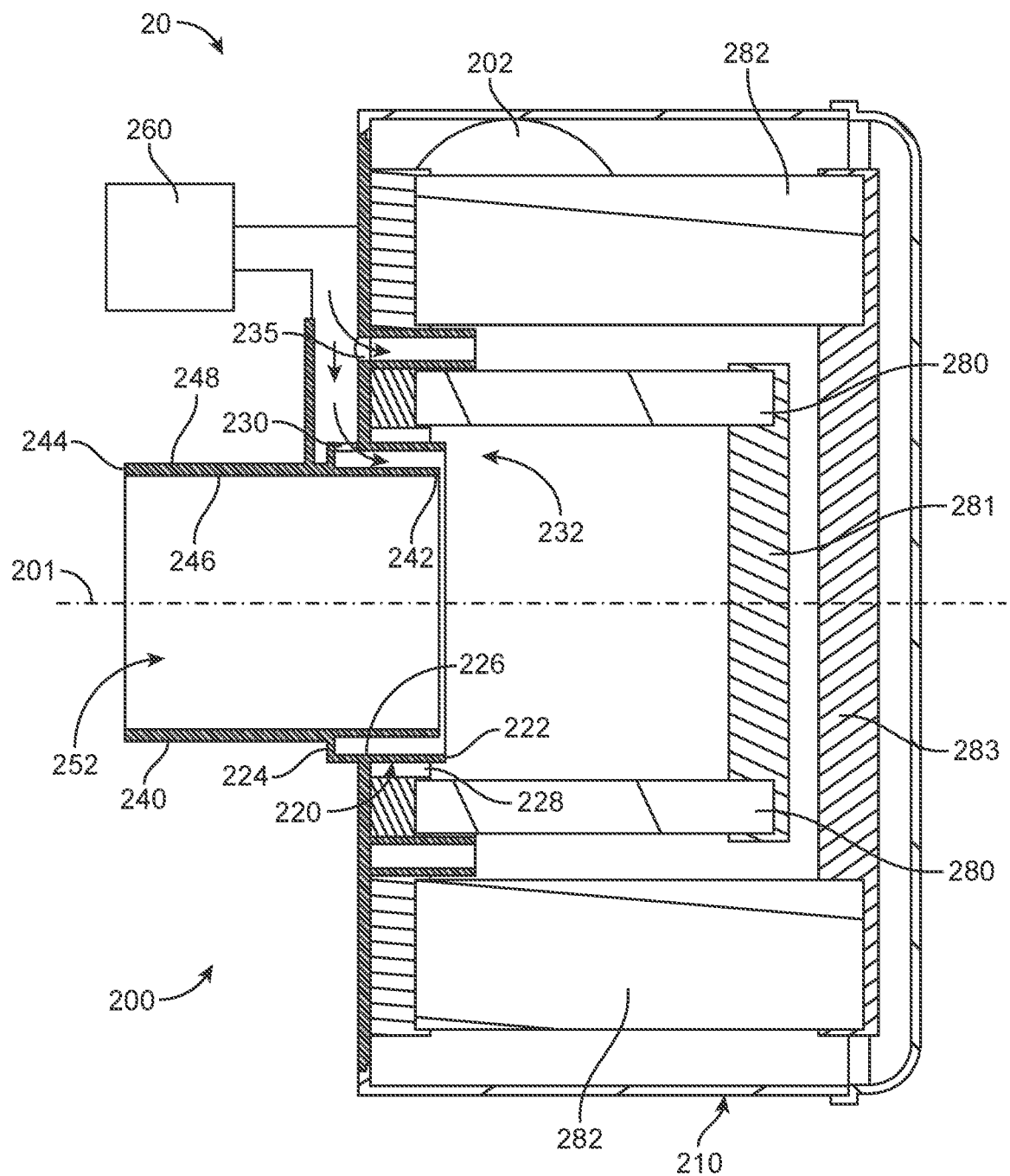
FIG. 8 is a cross-sectional schematic view of the air cleaner system of FIG. 7B taken along line 8-8' of FIG. 7B.

Additionally, FIGS. 7-8 illustrate another embodiment of a pulse ring assembly 200 that may be used in one or more embodiment of an air cleaner system as described herein. It is noted that the elements described with respect to FIGS. 1-6 also apply to the pulse ring assembly 200. As shown in FIGS. 7A and 7B, an air cleaner housing 210 may include an inlet 202 and an outlet tube 204. The outlet tube 204 may be operably connected to an engine intake such that the outlet tube 204 and the engine intake are in fluid communication. Air external to the air cleaner housing 210 may enter the inlet 202, passing through filter elements contained within the air cleaner housing 210, and exiting through the outlet tube 204 to the engine intake. Therefore, air entering the inlet 202 may be filtered (e.g., through the filter elements) and pass to the engine through the engine intake.

As shown in FIG. 8, the outlet tube 204 may be described as an inner tube 240 (e.g., similar to the inner tube 140 of FIGS. 3-4) that extends into the air cleaner housing 210. For example, the inner tube 240 may extend along a longitudinal axis 201 between an inner filter outlet end 242 and an inner engine intake end 244. The inner engine intake end 244 may be adapted to be operably coupled to an engine intake. The inner tube 240 may include an interior surface 246 and an exterior surface 248. The interior surface 246 of the inner tube 240 may define an inner tube passageway 252 through the inner tube 240 between the inner filter outlet end 242 and the inner engine intake end 244.

Further, the pulse ring assembly 200 may include an outer tube 220 extending between an outer filter outlet end 222 and an outer engine intake end 224. The outer tube 220 may include an interior surface 226 and an exterior surface 228. The interior surface 226 of the outer tube 220 may define an outer tube passageway 232 through the outer tube 220 between the outer filter outlet end 222 and the outer engine intake end 224. The outer tube passageway 232 may receive the inner tube 240 (e.g., the inner filter outlet end 242) such that at least a portion of the interior surface 226 of the outer tube 220 faces at least a portion of the exterior surface 248 of the inner tube 240.

The inner tube 240 and the outer tube 220 may extend into the air cleaner housing 210 and may be sealed to the air cleaner housing 210 such that air passing through the inner tube passageway 252 must first pass through filter elements (e.g., as will be described further herein) located within the air cleaner housing 210. The inner tube 240 and the outer tube 220 may extend into the housing 210 an equal distance (e.g., such that the inner filter outlet end 242 and the outer filter outlet end 222 are flush or even along the longitudinal axis 201). In other embodiments, the outer filter outlet end 222 may extend into the housing 210 farther than the inner filter outlet end 242 (e.g., as shown in FIG. 8) or the inner filter outlet end 242 may extend into the housing 210 farther than the outer filter outlet end 222.

Further, the outer tube 220 may include a pulse port 230 extending between the interior and exterior surfaces 226, 228 of the outer tube 220 (e.g., an opening in the outer tube 220) into the outer tube passageway 232. The pulse port 230 may be in fluid communication with a space between the inner and outer tubes 240, 220 such that gas directed into the pulse port 230 may take the shape of the gap between the inner and outer tubes 240, 220. For example, the area between the inner and outer tubes 220, 240 may form a ring (e.g., an annular shape) such that gas directed through the pulse port 230 forms a ring-shaped flow of gas towards the filter elements within the housing 210.

The air cleaner housing 210 may include a first filter cartridge 280 (e.g., a safety filter element) surrounding the inner and outer tubes 240, 220, and a second filter cartridge 282 (e.g., a primary filter element) surrounding the first filter cartridge 280. As such, air entering the inlet 202 passes through the second filter cartridge 282 and then the first filter cartridge 280, before passing through the inner tube 240 to the engine intake. In some embodiments, the first filter cartridge 280 may include smaller filter media openings than the second filter cartridge 282 such that the second filter cartridge 282 (e.g., the primary filter element) is designed to capture a large portion of the debris and sediment entering the inlet 202 and the first filter cartridge 280 (e.g., the safety filter element) is designed to capture other debris and sediment that may have passed through the second filter cartridge 282. Each of the first and second filter cartridges 280, 282 may include a first and second cap 281, 283, respectively, to seal the filter cartridges such that air only passes through the filter elements of the first and second filter cartridges 280, 282 before entering inner tube 240.

The pulse port 230 may be in fluid communication within the first filter cartridge 280 such that gas directed through the pulse port 230 may apply pressure to an interior surface of the first filter cartridge 280 to, e.g., push debris and sediment off the exterior surface of the first filter cartridge 280. Additionally, in one or more embodiments, multiple pulse ports may be incorporated into the pulse ring assembly 200 to clean various filter elements located within the air cleaner system 20. For example, as shown in FIG. 8, the housing 210 may define an additional pulse port 235 positioned between the first and second filter cartridges 280, 282. As such, gas directed through the additional pulse port 235 may take the shape of the gap between the first and second filter cartridges 280, 282. For example, the area between the first and second filter cartridges 280, 282 may form a ring (e.g., an annular shape) such that gas directed through the additional pulse port 235 forms a ring-shaped flow between the first and second filter cartridges 280, 282.

The gas directed through the additional pulse port 235 may be used to clean debris and sediment from the second filter cartridge 282. For example, the gas directed through the additional pulse port 235 may apply a force to an interior surface of the second filter cartridge 282 to push sediment and debris off an exterior surface of the second filter cartridge 28. Further, the gas directed through the additional pulse port 235 may provide a pressure barrier to improve the cleaning effectiveness of the gas directed through the pulse port 230. For example, gas directed through the additional pulse port 235 may create a lower pressure along the exterior surface of the first filter cartridge 280 such that gas directed through the pulse port 230 may more effectively push debris and sediment from the exterior surface of the first filter cartridge 280. Additionally, the gas directed through each of the pulse port 230 and the additional pulse port 235 may be controlled individually or together. For example, in one or more embodiments, the pulse ring assembly 200 may include a valve (e.g., a diaphragm valve (e.g., with solenoid activation), a poppet valve, etc.) or other flow control elements (e.g., orifices, etc.) to control the velocity, volume, pressure, etc. of the gas directed through each of the pulse port 230 and the additional pulse port 235. Also, the gap between the first and second filter cartridges 280, 282 and the gap between the inner and outer tubes 240, 220 may be sized to precisely control the volumetric flow of gas through each of the additional pulse port 235 and the pulse port 230, respectively.

Additionally, the air cleaner system 20 may include a pulse jet apparatus 260 in fluid communication with the pulse port 230 and the additional pulse port 235. The pulse jet apparatus 260 may be configured to direct gas through the pulse port 230 and/or the additional pulse port 235. For example, as described herein, the pulse jet apparatus 260 may direct gas through the pulse port 230 and the additional pulse port 235 independently or together. Further, the pulse jet apparatus 260 may be controlled or operate similar to the pulse jet apparatus 160 as described in reference to FIGS. 1-6.

In the preceding description, reference is made to the accompanying set of drawings that form a part hereof and in which are shown by way of illustration several specific embodiments. It is to be understood that other embodiments are contemplated and may be made without departing from (e.g., still falling within) the scope of the present disclosure. The preceding detailed description, therefore, is not to be taken in a limiting sense. All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

As used herein, "have", "having", "include", "including", "comprise", "comprising" or the like are used in their open-ended sense, and generally mean "including, but not limited to". It will be understood that "consisting essentially of", "consisting of", and the like are subsumed in "comprising," and the like.

It is noted that terms such as "top", "bottom", "above", "below", etc. may be used in this disclosure. These terms should not be construed as limiting the position or orientation of a structure, but should be used as providing spatial relationship between the structures.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. The disclosed embodiments are presented for purposes of illustration and not limitation.

What is claimed:

1. An air cleaner system comprising:
an outer tube extending between an outer filter outlet end and an outer engine intake end, wherein the outer engine intake end is operably connectable to an engine intake such that the outer tube and the engine intake are in fluid communication, wherein the outer tube comprises an interior surface and an exterior surface, wherein the interior surface of the outer tube defines an outer tube passageway through the outer tube between the outer filter outlet end and the outer engine intake end;
an inner tube extending along a longitudinal axis between an inner filter outlet end and an inner engine intake end, wherein the inner tube comprises an interior surface and an exterior surface, wherein the interior surface of the inner tube defines an inner tube passageway through the inner tube between the inner filter outlet end and the inner engine intake end, wherein the outer tube is configured to receive the inner filter outlet end within the outer tube passageway such that at least a portion of the interior surface of the outer tube faces at least a portion of the exterior surface of the inner tube proximate the inner filter outlet end, wherein filtered air is configured to flow from a first filter cartridge proximate the outer filter outlet end towards the engine intake proximate the inner engine intake end;
a housing extending around the exterior surface of the outer tube, wherein the outer tube and the inner tube each extend from the housing towards the engine intake, wherein the housing comprises a first filter cartridge in fluid communication with the inner tube passageway and a second filter cartridge surrounding the first filter cartridge, wherein the housing defines a pulse port positioned between the first and second filter cartridges outside of the outer tube passageway, and an inlet such that the first and second filter cartridges are positioned between the inlet and the inner tube passageway, wherein filtered air is configured to flow from the inlet towards the engine intake proximate the inner engine intake end; and
a pulse jet apparatus in fluid communication with the pulse port, wherein the pulse jet apparatus is configured to direct gas through the pulse port into a space between the first filter cartridge and the second filter cartridge.

2. The air cleaner system of claim 1, wherein the pulse port defines an annular shape between the first and second filter cartridges.

3. The air cleaner system of claim 1, wherein the pulse jet apparatus is configured to be selectively activated such that the gas is directed in discrete pulses through the pulse port.

4. The air cleaner system of claim 1, further comprising a flow control element configured to control at least one of a velocity, a volume, and a pressure of the gas directed through the pulse port.

5. The air cleaner system as in claim 4, wherein the flow control element comprises a valve.

6. The air cleaner system of claim 1, wherein a gap between the first and second filter cartridges is configured to control a volumetric flow rate of the gas through the pulse port.

7. The air cleaner system of claim 1, further comprising an additional pulse port extending between an interior surface and an exterior surface of the outer tube passageway, wherein the additional pulse port opens into an interior volume of the first filter cartridge.

8. The air cleaner system of claim 7, wherein the interior surface of the outer tube is concentric with and spaced a selected gap distance from the exterior surface of the inner tube.

9. The air cleaner system of claim 7, wherein the pulse jet apparatus is configured to selectively direct the gas through at least one of the pulse port and the additional pulse port.

10. The air cleaner system of claim 9, further comprising a controller operably connected to the pulse jet apparatus, wherein the controller is configured to selectively activate the pulse jet apparatus.

11. The air cleaner system of claim 10, wherein the controller is configured to activate the pulse jet apparatus in response to a predetermined pressure differential across the second filter cartridge.

12. The air cleaner system of claim 1, wherein a pulse port opening is positioned at an intermediate location between a first end and a second end of the second filter cartridge.

13. An air cleaner system comprising:
an inner tube extending along a longitudinal axis between an inner first end and an inner engine intake end, wherein the inner tube comprises an interior surface and an exterior surface, wherein the interior surface of the inner tube defines an inner tube passageway through the inner tube between the inner first end and the inner engine intake end;
an outer tube comprising an interior surface and an exterior surface, wherein the interior surface of the outer tube defines an outer tube passageway through the outer tube, wherein the outer tube is configured to receive at least a portion of the inner tube within the outer tube passageway to define a pulse port between the interior surface of the outer tube and the exterior surface of the inner tube;
a housing containing a first filter cartridge in fluid communication with the inner tube passageway and a second filter cartridge surrounding the first filter cartridge, wherein the outer tube and the inner tube each extend away from the housing, wherein the pulse port is positioned between the first and second filter cartridges, wherein air is configured to flow into the housing through an inlet to the inner engine intake end of the inner tube after passing through the first and second filter cartridges; and a pulse jet apparatus in fluid communication with the pulse port, wherein the pulse jet apparatus is configured to direct gas through the pulse port into a space between the first filter cartridge and the second filter cartridge.

14. The air cleaner system of claim 13, wherein the pulse port defines an annular shape between the first and second filter cartridges.

15. The air cleaner system of claim 13, further comprising a flow control element configured to control at least one of a velocity, a volume, and a pressure of the gas directed through the pulse port.

16. The air cleaner system of claim 15, wherein the flow control element comprises a valve.

17. The air cleaner system of claim 13, wherein the pulse jet apparatus is configured to be selectively activated such that the gas is directed in discrete pulses through the pulse port.

18. The air cleaner system of claim 13, wherein the interior surface of the outer tube is concentric with the exterior surface of the inner tube.

19. The air cleaner system of claim 13, wherein particulate disposed on an exterior surface of the second filter cartridge is blown off of the second filter cartridge when the gas is directed through the pulse port.

20. The air cleaner system of claim 1, wherein the outer tube and the inner tube each extend into the housing.

* * * * *